United States Patent [19]
Nichting et al.

[11] Patent Number: 5,313,815
[45] Date of Patent: May 24, 1994

[54] APPARATUS AND METHOD FOR PRODUCING SHAPED METAL PARTS USING CONTINUOUS HEATING

[75] Inventors: Roger A. Nichting, Denver; Norman H. Nicholas, Lakewood, both of Colo.; Kenneth P. Young, Uzwil, Switzerland

[73] Assignee: Amax, Inc., New York, N.Y.

[21] Appl. No.: 970,613

[22] Filed: Nov. 3, 1992

[51] Int. Cl.$^5$ ............................................. B21J 1/06
[52] U.S. Cl. ...................................... 72/364; 219/602
[58] Field of Search .................. 72/364; 164/507, 513, 164/900; 219/10.69

[56] References Cited

U.S. PATENT DOCUMENTS

| | | | |
|---|---|---|---|
| 3,005,894 | 10/1961 | Carbo et al. | 219/10.69 |
| 3,056,876 | 10/1962 | Schmidt | 219/10.69 |
| 4,220,106 | 9/1980 | Supik | 219/10.69 |
| 4,537,242 | 8/1985 | Pryor et al. | 164/900 |
| 4,569,218 | 2/1986 | Baker et al. | |

OTHER PUBLICATIONS

Malachi P. Kenney et al., "Semisolid Metal Casting and Forging", *New and Emerging Processes*, pp. 327–338, also printed in *Metals Handbook*, vol. 15, 9th Ed., and *Casting*, ASM International, Metals Park, OH 1988.

M. C. Flemings and K. P. Young, "Rheocasting," *Yearbook of Science and Technology*, McGraw-Hill, New York, 1978.

*Primary Examiner*—Lowell A. Larson
*Attorney, Agent, or Firm*—Jones & Askew

[57] ABSTRACT

Shaped metal parts are produced on a continuous basis from a semi-solid metal perform. A plurality of free-standing metal slugs are sequentially heated within an arcuate path defined by a pair of concentrically-positioned solenoid coils to a semi-solid state, such that they may be shaped into a metal part. Means for rotating the slugs during their movement through the arcuate path is also provided.

16 Claims, 5 Drawing Sheets

APPARATUS AND METHOD FOR PRODUCING SHAPED METAL PARTS USING CONTINUOUS HEATING

TECHNICAL FIELD

This invention relates in general to the production of shaped metal parts, and in particular relates to continuous heating of metal elements which are formed by a semi-solid metal forming technique.

BACKGROUND OF THE INVENTION

Vigorous means for the agitation of metals during solidification are known to eliminate dendritic structures and produce semisolid "slurry structured" materials with thixotropic characteristics. It is also known that the viscosities of such materials may be high enough to be handled as a soft solid. Re Rheocasting, Merton C. Flemings and Kenneth P. Young, McGraw-Hill Yearbook of Science and Technology, 1977–78. However, processes for producing shaped parts from such slurry structured materials, particularly on a continuous basis, present a number of problems. Such processes require a first step of reheating a slurry structured billet charge or "slug" to the appropriate fraction solid and then forming it while in a semisolid condition. A crucible has been considered essential as a means of containing the material and handling it from its heating through its forming cycle. The use of such crucibles is costly and cumbersome and furthermore creates process disadvantages such as material loss due to crucible adhesion, contamination from crucible degradation and untoward chilling from random contact with crucible side walls. Other problems are involved in the heating, transport and delivery of billets which are in a semisolid condition. Therefore, it has been found desirable to provide an apparatus and process for producing shaped metal parts from semisolid preforms, as such a process provides considerable manufacturing economy, especially if it does not require crucibles or other containing means and it is capable of operation on a continuous basis.

One approach has been the use of induction heating. Induction heating is a preferred choice for slug heating in SSM forming since it is clean, efficient, and can be tightly controlled via electrical input. A number of induction heating schemes have been devised and at least one is the subject of U.S. Pat. No. 4,569,218 issued Feb. 11, 1986, hereby incorporated by reference. Nearly all of these existing SSM heating systems utilize vertically oriented solenoid induction coils which either 1) raise and lower to sequentially capture slugs transported through the system on refractory pedestals, or 2) are stationary but through which the slugs are raised and lowered as they transport through the system.

However, such systems may be cumbersome with a number of moving parts. In addition, the persistent raising and lowering of either slugs or coils exposes the slugs to a variety of conditions which can pose problems of differential heat losses and consequent inconsistency of heating. Furthermore, since the slugs move both vertically and horizontally it is extremely difficult to provide protective atmosphere or heat shields.

Therefore, there is a recognized need for an improved method and apparatus for heating metal members to a semi-solid state, in order that the members may be formed as desired.

SUMMARY OF THE INVENTION

Accordingly, we have developed a unique solution to these problems by providing a method and apparatus for heating metal members to a semi-solid state, which utilizes two concentric solenoid coils powered by a single source, and a carousel assembly which allows for continuous, even, heating of the metal members. An additional benefit of this approach is the elimination of power connection leads since the system may be mounted directly upon the power source and power connected via a central coaxial cable/conduit which extends up through the center of a rotating carousel. This conserves space and energy or power losses due to dissipation in the leads.

Generally described, the present invention is directed towards a method for heating by electrical induction and forming a metal element, comprising the steps of positioning the metal element within a first location in a space defined by two concentrically-positioned, electrically-energized solenoid coils, moving the metal element through a path defined by the coils from the first location to a second location while current is passing through the coils and heating the metal element by electrical induction, such that the metal element is heated to semi-solid form; and withdrawing the metal element from the second location and forming the element with a semi-solid forming technique.

Therefore, it is an object of this invention to provide a method and apparatus for producing shaped metal parts using continuous heating.

It is a further object of the present invention to provide a method and apparatus for producing shaped metal parts which is simple in operation and construction.

It is a further object of the present invention to provide a method and apparatus for producing shaped metal parts, which is economical to produce and operate.

It is a further object of the present invention to provide a method and apparatus for producing shaped metal parts, in which improved metal parts may be manufactured.

It is a further object of the present invention to provide a method and apparatus for producing shaped metal parts, in which metal loss is minimized.

It is a further object of the present invention to provide a method and apparatus for producing shaped metal parts in which a variety of shaped metal parts having varying shapes and weights may be provided.

It is a further object of the present invention to provide a method and apparatus for producing shaped metal parts in which improved heating of the parts is provided by means of rotating part support pedestals.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
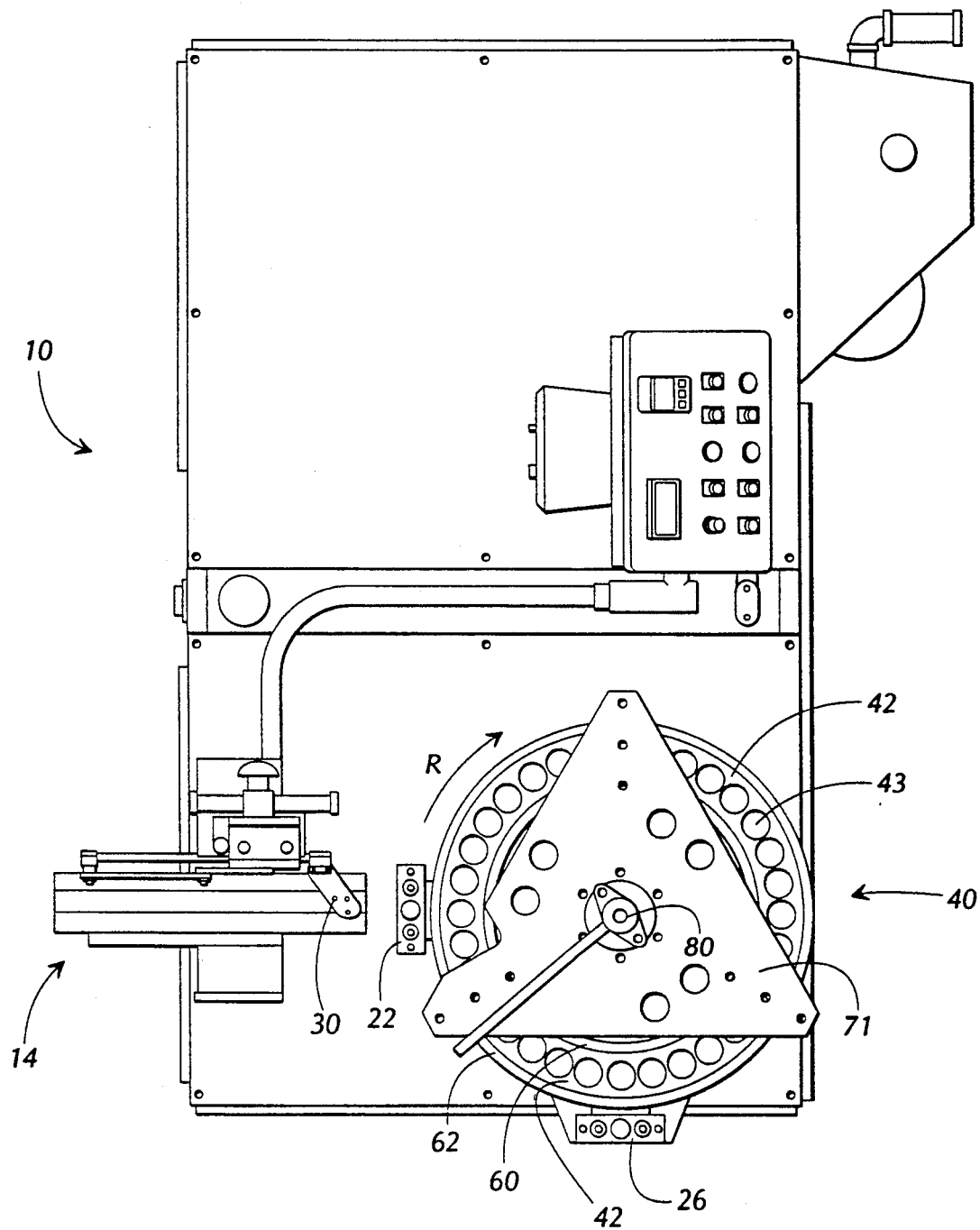
FIG. 1 is a top plan view of the preferred embodiment of a system including the apparatus according to the present invention, without slugs or an insulating cover in place.

Reference is now made to the drawings, in which like numerals illustrate like elements throughout the several views.

General Operation

The operation of the method and apparatus according to the present invention is now described in general. Referring generally to the figures, a plurality of slugs 20 are provided to the apparatus 10 via a loading apparatus 30, which loads the slugs from a vibrating conveyor apparatus 14 onto a rotatable carousel assembly 40 of the apparatus 10 which rotates about a main center axis "C". The carousel assembly 40 itself includes an insulating ring 42 which defines a plurality of cavities 43. The carousel assembly also includes a plurality of pedestal assemblies 50, each of which includes a pedestal 51 which may be moved up and down relative to the carousel within a corresponding cavity, preferably without contacting the insulating ring 42 or the cavity liners 44.

The slugs 20 are positioned one-by-one atop corresponding pedestals 51 while in their "up" position, such that the slugs rest atop the pedestals under the influence of gravity. After the positioning of a particular slug 20 atop a particular pedestal 51, the pedestal is then indexed downwardly, such that the slug is positioned within a corresponding cavity, and is prepared for heating.

Heating of the slugs 20 is provided by means of an inner solenoid 60 and an outer solenoid 62, each stationary and positioned in concentric fashion (having the previously-discussed main center axis passing through their centers) on each side of the path of the circular insulating ring. Each of the two solenoids provides heat through induction heating to the slugs as the carousel is rotated relative to the stationary solenoids. The slugs are indexed through approximately 270 degrees of a circular path before being removed from the apparatus, upon which the slug temperature is preferably raised to an adequate level in order that it may be removed and formed by a semi-solid metal (SSM) forming technique.

Specific Discussion

More detailed discussion of the invention is now made.

Insertion Apparatus/Process

The insertion apparatus is substantially similar in operation to the insertion apparatus shown in the U.S. Pat. No. 4,569,218 to Baker, entitled "Apparatus and Process for Producing Shaped Metal Parts", issued Feb. 11, 1986. In summary, the slugs 20 are individually gripped and transferred from a vibratory conveyor 14 (as known in the art) to the pedestals 51 by means of a loading apparatus, the transfer being accomplished when the carousel assembly is stationary.

Carousel Movement

Figure 2:
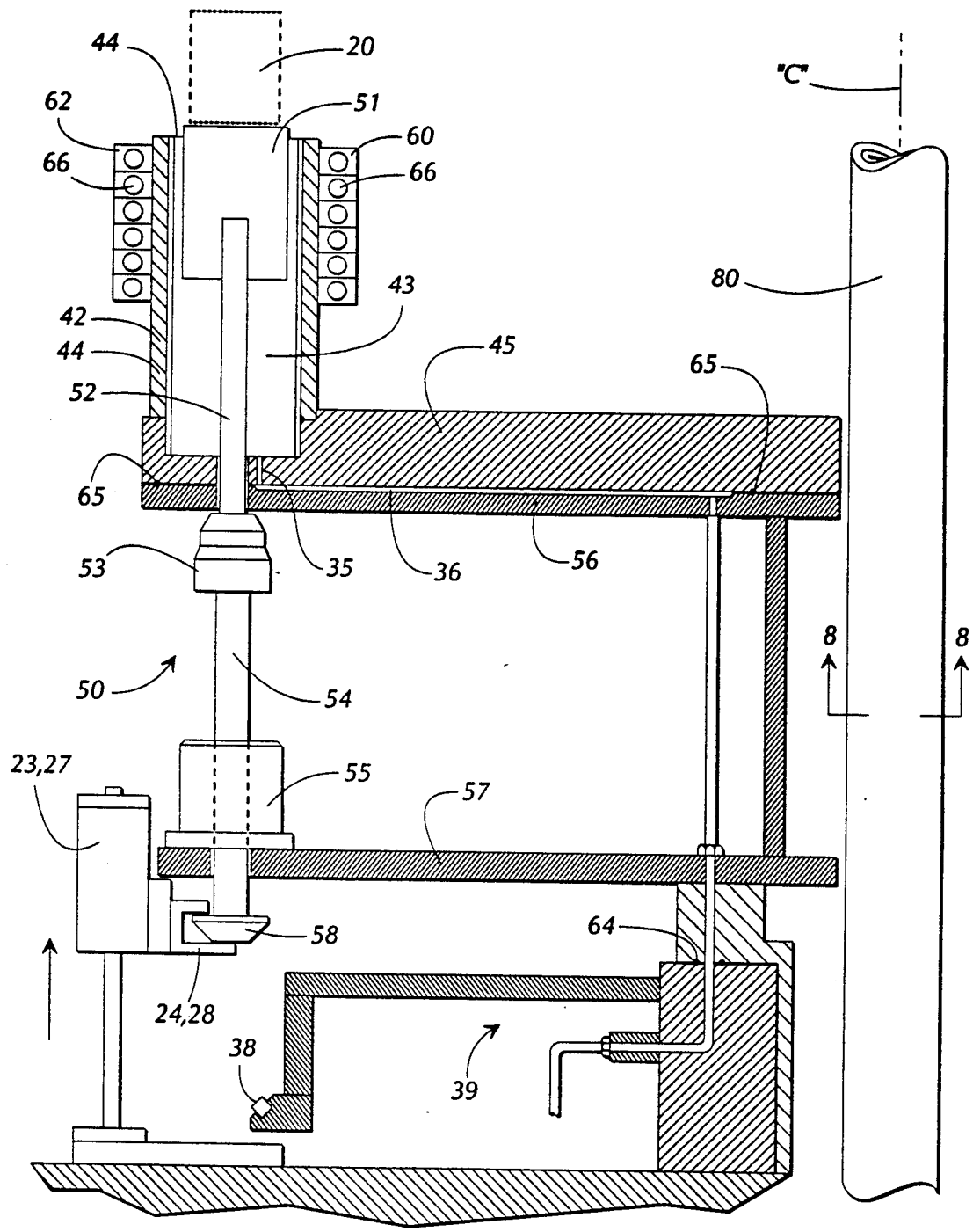
FIG. 2 is an isolated side partial cut-away view of a portion of the apparatus of FIG. 1, illustrating the pedestal in its "upper" position.
Figure 3:
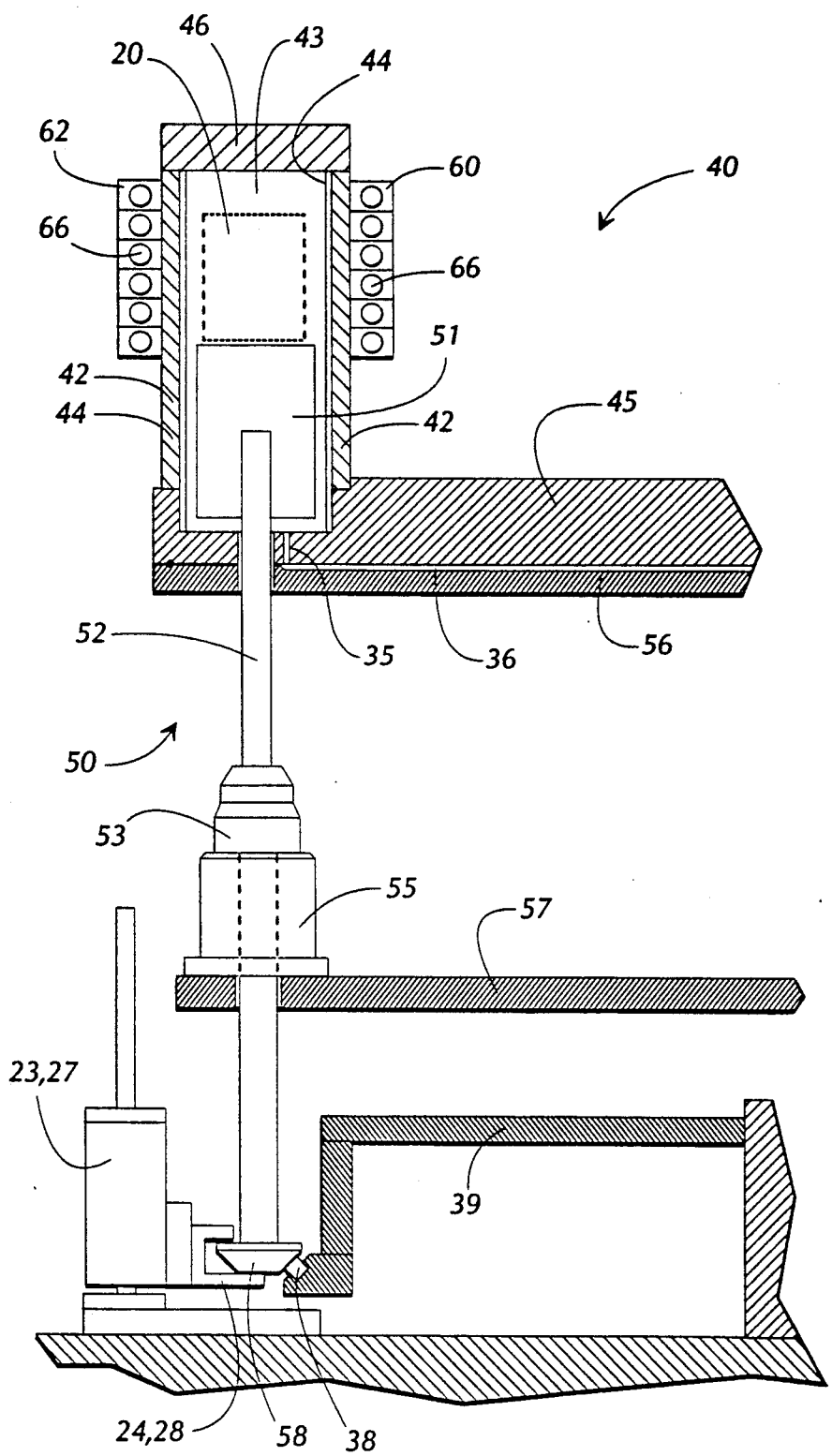
FIG. 3 is the view of FIG. 2, but with the pedestal in its "lower" position.

Referring to FIGS. 2 and 3, the carousel assembly 40 includes a ceramic insulating ring 42, a plurality of pedestal assemblies 50 (numbering 32 in the preferred embodiment), and upper and lower circular shelves 56, 57. The carousel assembly 40 is configured to rotate about a central, substantially vertical, main axis "C" (See FIG. 2) relative to the base 11, through a series of periodic index steps.

Figure 4:
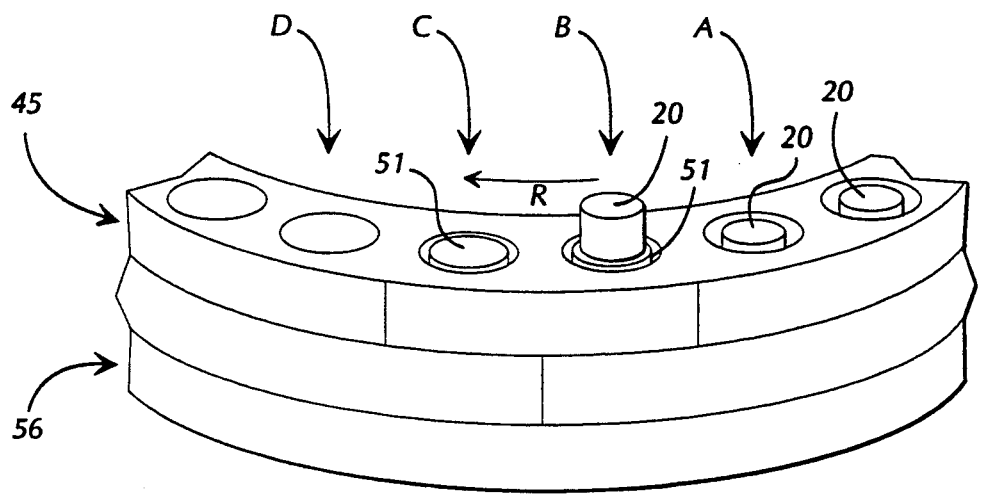
FIG. 4 is an isolated view of a portion of the carousel assembly according to the present invention, particularly illustrating the slugs at their point of exit from the ceramic carousel.

The cavities 43 defined by the ceramic ring 42 may be thought of as borelike, with the longitudinal axes of the bores being substantially parallel and vertical in the preferred embodiment, and substantially parallel to the rotational axis of the carousel assembly. The insulating ring 42 is rigidly affixed atop a ceramic plate 45, which is itself affixed atop an upper circular shelf 56. Tubular insulating cavity liners 44 are positioned within each cavity. As seen in FIG. 4, the ceramic ring is actually segmented along the dotted lines shown in FIG. 4, such that each segment portion partially defines two cavities 43. This is advantageous in that damage to one segment of the ring only requires replacement of that particular segment.

Each pedestal assembly 50 includes a ceramic pedestal 51 in the shape of a right cylinder, an elongate ceramic rod 53 attached to and supporting the pedestal, and a drill chuck or collet assembly 53, which accepts and grips the lower end of the ceramic rod.

The collet assembly 53 of each pedestal assembly 50 is supported by the upper end of a metal elongate rod 54. At a medial portion of rod 54 is provided a bearing 55, which is rigidly mounted to lower circular shelf 57. Each bearing 55 allows its corresponding rod 54 to be rotatably and slidably supported relative to lower circular shelf 57 of the carousel assembly.

A tapered and knurled collar 58 (one per pedestal assembly) is attached to the lowermost end of each rod 54. These tapered and knurled collars 58 serve two functions; they allow the ceramic pedestals to be rotated about their own substantially vertical longitudinal axes during the heating process, and also allow the pedestals to be raised and lowered (via pneumatically-driven yokes) to facilitate loading and unloading of the slugs as discussed later in further detail.

FIG. 2 illustrates a pedestal 51 in its upward position with a slug positioned atop this pedestal. FIG. 3 illustrates a pedestal 51 in its lower position. The movement from the upward position to the lower position (and vice versa) is provided by means of the cooperation of the tapered and knurled collar and one of two yokes each similar in operation: a loading yoke 24 driven by a pneumatic cylinder 23, each a part of the slug loading station 22, and an unloading yoke 28 driven by a pneumatic cylinder 27, each being part of the "hot" slug unloading station 26.

After the slug (in its "cool" state) has been loaded into the position as shown in FIG. 2 by the cool pedestal indexing station 22, the loading yoke 24 is indexed downwardly, which draws it down to the position shown in FIG. 3. The carousel assembly is then rotatably indexed about substantially vertical axis "C" (See FIG. 2) to another stationary position, such that its corresponding tapered collar 58 is out of the grasp of the loading yoke 24. Such an rotating indexing causes the next tapered and knurled collar 58 to be within the grasp of the loading yoke 24. At this point, the pneumatic cylinder 23 is actuated such that the loading yoke is indexed upwardly to allow the next pedestal 51 to accept a slug. The process is then repeated.

As the carousel assembly is rotated about its circular path and about its central axis, along a portion of that circular path each of the carousals rotates about their own axes separate from the central axis, due to the frictional interaction of tapered and knurled collar 18 and rubber ring 38. As may be seen, the inclined surface portion of the tapered ring (this surface portion being the knurled portion) is in frictional contact with the inclined surface of the rubber ring 38, such that as the carousel assembly is periodically indexed from one position to the other, the tapered collar 58 will be rotated, thus rotating its corresponding pedestal and slug. During each index step of the carousel, the slugs rotate approximately 15 degrees about their own longitudinal axes (although other degrees of rotation may be practiced without departing from the spirit and scope of the present invention). Note that the individual axes of rotation of the pedestals are not the same as axis "C", but spaced apart in a circle having axis "C" passing through its center. This is an advantageous feature provided by the inventions, in that more even heating may be provided to the slugs.

When each pedestal assembly reaches its hot pedestal indexing station 26 (See FIG. 1), its corresponding tapered and knurled collar is positioned within an "unloading" yoke 28, much like was the case with respect to the loading yoke 24. An unloading pneumatic cylinder 27 is then activated to cause the pedestal to move upwardly, such that the slug may then be removed from its pedestal as discussed in further detail below. It may be appreciated that the upward and downward indexing of the pedestal assemblies during the loading and unloading stages is very similar in operation. However, there is a difference in that two pedestal assemblies are indexed by the ejection pneumatic solenoid. As may be seen with respect to FIG. 4, this is to allow a slug to be removed from a pedestal at station "B" (after being indexed upwardly from station "A"), while also allowing the "downstream", just-emptied, pedestal at station "C" to be cleaned by an air blast, mechanical wipe, or the like. The two pedestal assemblies are so upwardly indexed by means of an ejection yoke of sufficient width so as to accept two tapered and knurled collars at once. After a pedestal is cleaned, it is retracted down at station "D".

Heating

As the slugs travel in their path of movement from the loading to the unloading position, it may be understood that inner and outer solenoid coils provide heat through induction heating, which causes the temperature of the slugs to increase.

Figure 5:
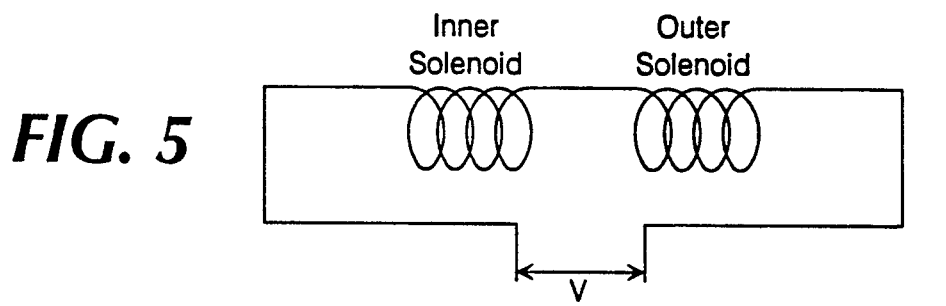
FIG. 5 is an electrical schematic.
Figure 6:
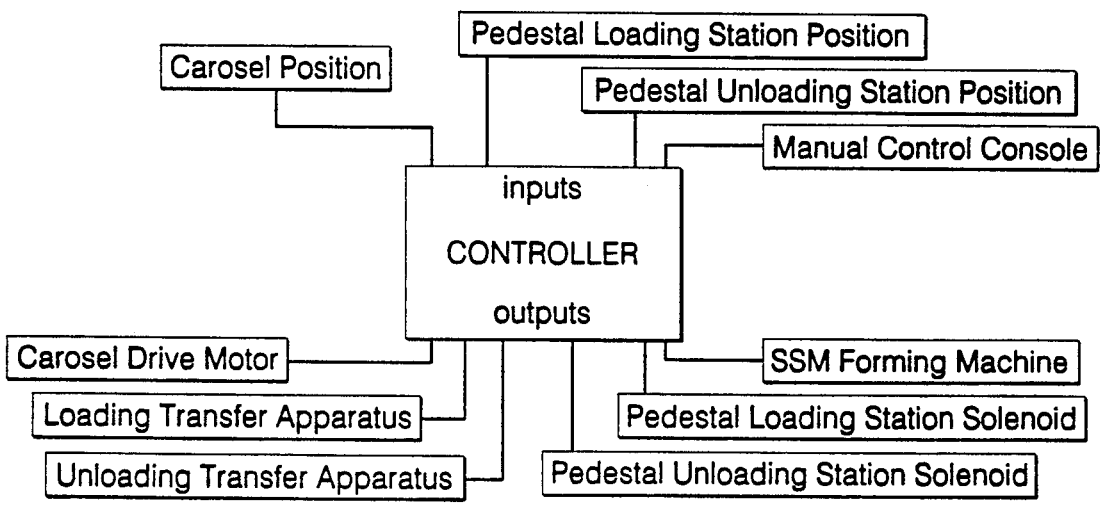
FIG. 6 is an illustrative view of the interrelationship between a central controller and other controlled elements.
Figure 7:
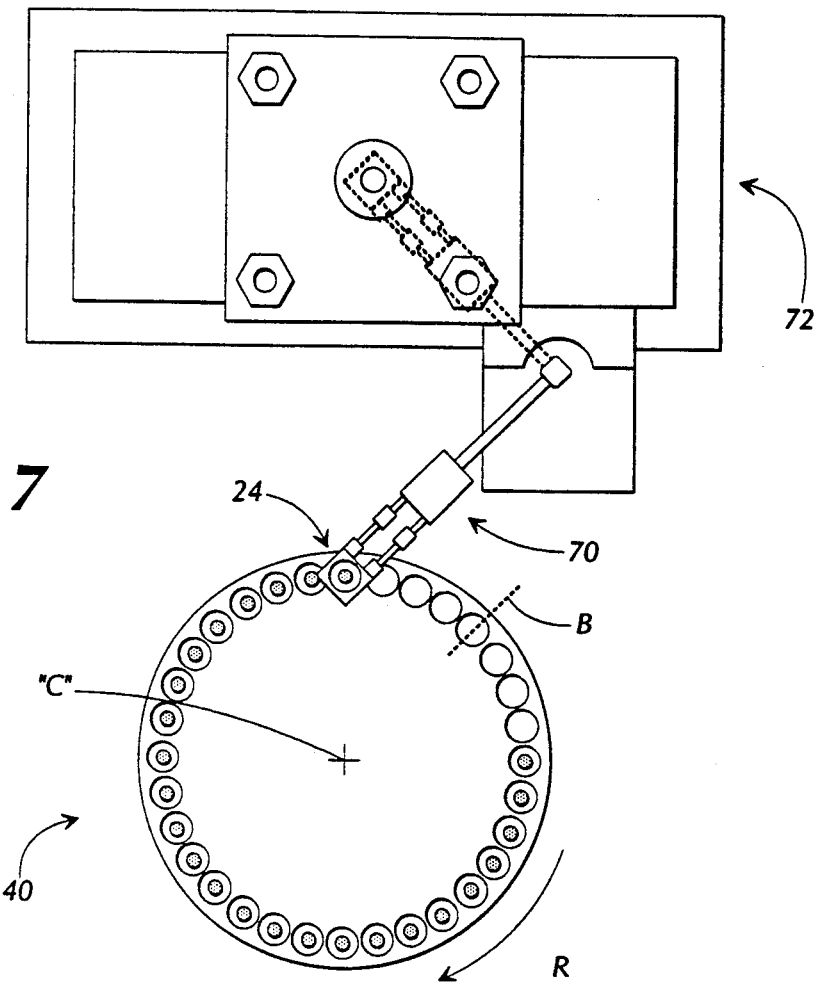
FIG. 7 is a top plan view which illustrates the interrelationship between the rotating carousel and a SSM (semi-solid metal) forming apparatus.
Figure 8:
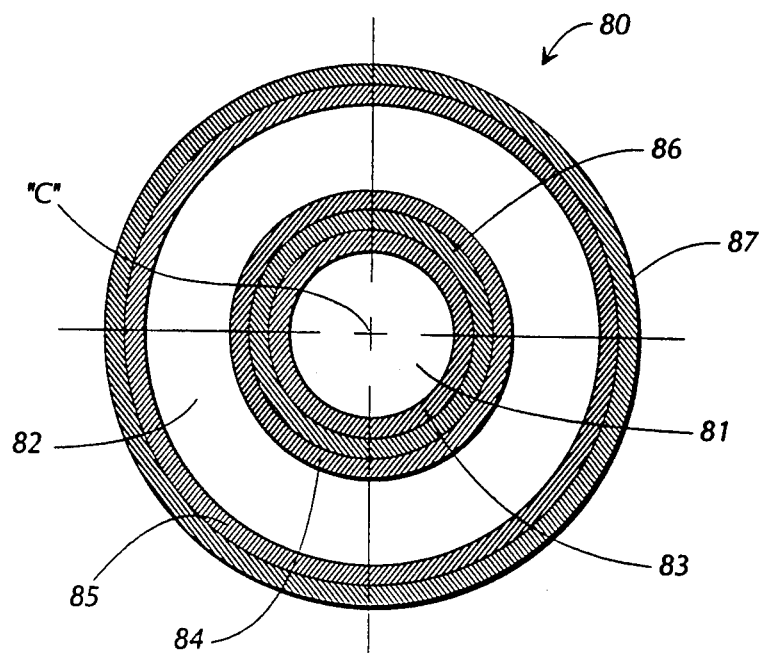
FIG. 8 is a cross-section of the central, nonrotating, coaxial cable/conduit member.

As shown in FIGS. 1 and 4, the solenoid coils 60, 61, are concentrically positioned on each side of the path of the insulating ring, such that a fluctuating magnetic field is present therein, allowing for induction heating of the metal slugs while in the field. As seen in FIG. 5, the solenoids are wired in series, and power to them is provided by alternating current, 250 kW, 3000 Hz source, which provides a range of 1000–3000 Amps, although other power sources may be used while still remaining within the spirit and scope of the present invention. A connecting electrical bridge (the approximate location which is shown on the dotted line as "B" in FIG. 7) is provided to allow electrical connection between the two circular solenoids. However, the bridge crosses above the portion of the insulating ring which never contains the slugs—this is preferable in that undesirable flux concentrations or deficiencies are avoided. As seen in FIGS. 1 and 2, this conduit member 80 is stationary, and its central longitudinal axis is the axis about which the carosel assembly rotates. Referring particularly to FIG. 8, the conduit supplies coolant to the solenoid coils through cavity 81, and the coolant is returned from the coils through cavity 82. The conduit likewise supplies AC electrical power to the solenoid coils through inner coaxial conductor 83 and a pair of outer coaxial conductors 84, 85. Black heat shrink insulation is provided at locations 86, 87. This, the material between members 83 and 84 provides electrical insulation. Member 83 is line 1 of the power supply circuit, members 84 and 85 are line 2 of the supply (i.e. common or ground).

Coolant is provided within cavities 66 (see FIGS. 2 and 3) defined by the solenoid coils, to provide a cooling effect. Shunt tabs may be provided if it is required to bypass one or more the solenoid coils for selective variation of the magnetic field either or both of the solenoids.

The power source is provided to the stationary solenoid coils through a central coaxial cable/conduit, having a center axis "C" about which the carousel rotates. The solenoid coils are held in place by means of a coil saddle 71 (See FIG. 1) which is rigidly attached to the coaxial cable/conduit 80 (discussed in detail further below). The solenoid coils are suspended beneath the saddle, such that they remain stationary.

As is known in the art, shield gases are provided in the vicinity of the heated slugs, to prevent oxidation of the exterior surface of the slugs. One preferred shield gas is a 96% Argon and 4% Hydrogen mixture by weight. Gas supply passages 35, 36, cooperate to provide such gases such that they are eventually to be situated within each of the cavities 43. It may be understood that for each cavity 43, at least one gas passage 35 is drilled through the ceramic plate 45, and at least one gas passage 36 is milled into the upper surface of upper circular shelf 56. The close contact of the lower surface of the ceramic plate 45 with the upper surface of the upper circular shelf 56 provides sealing of the passages 36.

Gas is supplied to the passages 36 from a stationary source by providing a rotating seal through the 32 station, indexing drive unit (in the preferred embodiment a Camco index table). A rotating seal is located at 64, which allows gas to be transferred from an outside source into the rotating shelf 56. O-ring seals (viton-rubber) are also provided at 65 to facilitate gas sealing.

If desired, a stationary suspended refractory lid 46 may be provided over a portion of the heating path of the slugs to provide thermal insulation and to maintain presence of gas shielding.

Ejection Apparatus/Process

As previously discussed, when the slugs have reached the exit station of the apparatus 10, they are indexed upwardly by an upward movement of the unloading cylinder 27, and are exposed. At this point, the preferably semi-solid slugs may be grasped by a gripper 70 such as shown in FIG. 7, and transferred to a semisolid forging station 72. The grippers may be heated, as described in U.S. Pat. No. 4,569,218 issued Feb. 11, 1986 (incorporated by reference), or alternatively may not be heated.

The Step-by-Step Process

It may be understood that the above-described apparatus operates in a cyclic fashion, with cyclic movement of slugs through a continuous magnetic field. Each cycle operates substantially as follows:

1) start a cycle timer for a preset time (carousel stationary)
2) finish cycle timer (carousel stationary)
3) start index at preset speed (carousel stationary)
4) finish index (carousel stationary)
5) raise both "cold load" and "hot unload" pedestal stations (carousel stationary)
6) actuate both cold load and hot unload transfer apparatuses (carousel stationary)
7) cold load delay timer complete (carousel stationary)
8) lower cold load pedestal (carousel stationary)
9) hot load delay timer complete (carousel stationary)
10) lower hot load pedestal (carousel stationary)
11) start cycle timer for a preset time (carousel stationary)

Compositions, Dimensions

The pedestals 51 may be composed of cordierite strainers 200 PPI, in practice 1⅛" dia × 1½" long.

The insulating ring and lid may be composed of Pyrotech N-14 fused-foam silica material.

The rods 52 may be composed of Coors AD-99.5 alumina rod, in practice ¼" in diameter.

The glass liners 44 may be composed of quartz tubing.

The radius of the inner solenoid coils may be approximately 12 inches, with the spacing between the inner and outer coils being approximately 1⅞".

High frequency electric alloy #110 copper induction water-cooled tubing, ⅜" wide × ½" high, may be used to create the solenoid coils. The approximate overall length of the tubing used is 650 inches.

Actual Slug Processing

The following are examples of actual slugs processed under the method and apparatus of the present invention.

In one instance, a 440 C stainless steel slug, ⅜" OD × 1½" high, was processed. Amperage through the solenoid coils was set at approximately 3040 amps (0.76 × 4000). The cycle time was set at 20 seconds, with stations 1–24 in use. The pyrometer reading at exit was approximately 1240° C.

In another instance, a C337 copper alloy (forging brass) slug ⅜" OD × 1½" high was passed through stations 1–24. Amperage was set at approximately 1520 amps (0.38 × 4000). Cycle time was set at 20 seconds. Exit temperature was approximately 888° C.

In another instance, aluminum alloy 357 slugs, ⅜" OD × 1⅞" high, were passed through stations 1–24. Amperage through the solenoid coils was set at approximately 704 amps (0.176 × 4000). Exit temperature (measured by thermocouple) was approximately 584° C.

Alternatives

An alternative to the scheme shown in FIG. 1 is to line the inside diameters of the coil with refractory material (no use of a moving ceramic insulating ring) and to allow the slugs to travel on pedestals through the system. This eliminates the carousel and provides an effective way to cope with the dripping phenomena common to aluminum alloy SSM heating.

Other alternatives include the use of differing carousals for differing slug sizes.

Conclusion

While this invention has been described in specific detail with reference to the disclosed embodiments, it will be understood that many variations and modifications may be effected within the spirit and scope of the invention as described in the appended claims.

What is claimed is:

1. A method for heating by electrical induction and forming a metal element, comprising the steps of:
   a) positioning said metal element within a first location in a space defined by two concentrically-positioned, electrically-energized solenoid coils connected by an electrical bridge, said pair of solenoid coils defining an arcuate path not passing under said electrical bridge;
   b) moving said metal element through said arcuate path defined by said coils from said first location to a second location while current is passing through said coils and heating said metal element by electrical induction, such that said metal element is heated to semi-solid form but does not pass under said electrical bridge; and
   c) withdrawing said metal element from said second location and forming said element with a semi-solid forming technique.

2. The method as claimed in claim 1, wherein said metal element moves along said path while within a thermally-insulated cavity defined by a ring-like insulation member positioned concentrically and rotating between said concentrically-positioned coils, such that said path of movement of said metal element between said first position and said second position is substantially arcuate.

3. A method for heating by electrical induction and forming a metal element, comprising the steps of:
   a) positioning said metal element upon a supporting pedestal at a first level;
   b) moving said pedestal such that said element moves from said first level to a second level and is in an arcuate space defined between adjacent portions of two concentrically-positioned, electrically-energized solenoid coils;
   c) moving said pedestal while alternating electric current is passing through and energizing said coils such that said metal element is heated by thermal induction while moving from said first location to a second location along a path at said second level which is within said space between said coils;
   d) moving said pedestal from said second level to said first level such that said element moves out from between said said coils; and
   e) withdrawing said metal element from said second location and forming said element with a semi-solid forming technique.

4. The method as claimed in claim 3, wherein said metal element moves along said path while within a thermally-insulated cavity defined by a ring-like insulation member positioned concentrically and rotating between said concentrically-positioned coils, such that said path of movement of said metal element between said first position and said second position is substantially arcuate.

5. The method as claimed in claim 4, wherein during step "c" said pedestal rotates about its own axis relative to said ring-like member, such that said metal element also rotates about its own axis relative to said ring-like member during movement of said element along said arcuate path.

6. The method as claimed in claim 5, wherein said pedestal and said element rotate at least 180 degrees along their own axes during the movement of said metal element along its path.

7. The method as claimed in claim 5, wherein said pedestal and said element rotate at least 270 degrees along their own axes during the movement of said metal element along its path.

8. The method as claimed in claim 5, wherein said metal element moves through a series of indexed steps comprising said path.

9. The method as claimed in claim 8, wherein said pedestal and said metal element rotate approximately 15 degrees about the rotational axis of said pedestal during each of said indexed steps.

10. An apparatus for continuously producing shaped metal elements, comprising:
   a) a pair of concentrically-positioned solenoid coils connected by an electrical bridge, said pair of solenoid coils defining an arcuate path not passing under said electrical bridge;
   b) means for energizing said coils so that a magnetic field is generated in said arcuate path;
   c) means for passing at least one of said metal elements through said energized arcuate path such that said one of said metal elements does not pass under said electrical bridge;
   d) transfer means for removing said element from said path, and
   e) means for forming said metal part by a semi-solid forming technique after being heated by said magnetic field.

11. The apparatus as claimed in claim 10, further comprising a rotating thermal insulating ring rotatable about a central axis and defining a cavity for accepting said metal element such that said as said metal element passes through said path, said ring rotates along with said element such that said cavity continues to surround said element.

12. The apparatus as claimed in claim 11, further comprising rotating means for rotating said metal element around its own rotational axis relative to said ring as said element passes along said path and within said cavity.

13. The apparatus as claimed in claim 12, wherein said rotating means rotates said metal element at least 180 degrees along its rotational axis as it passes along said path.

14. The apparatus as claimed in claim 12, wherein said rotating means rotates said metal element at least 270 degrees along its rotational axis as it passes along said path.

15. The apparatus as claimed in claim 14, further comprising means for indexing said metal element a series of finite stop-and-start steps through said path.

16. The apparatus as claimed in claim 15, wherein said metal element rotates approximately 15 degrees per index step.

* * * * *